July 19, 1966 R. V. BURTON 3,261,372

FLUID CONTROL ELEMENT

Filed May 6, 1963 2 Sheets-Sheet 1

INVENTOR.
ROBERT V. BURTON
BY Alfred N. Feldman
ATTORNEY

INVENTOR.
ROBERT V. BURTON
BY Alfred N. Feldman
ATTORNEY

United States Patent Office 3,261,372
Patented July 19, 1966

3,261,372
FLUID CONTROL ELEMENT
Robert V. Burton, Minneapolis, Minn., assignor to Honeywell Inc., a corporation of Delaware
Filed May 6, 1963, Ser. No. 278,081
1 Claim. (Cl. 137—81.5)

The present invention is directed to an improved fluid control element of the fluid amplifier type, and, more particularly, is directed to a fluid amplifier having an intermediate isolation chamber between the control ports and the outlet to absorb any transient fluid pulses that are developed in the outlet of the device.

Since the introduction of fluid amplifiers in 1960, many types and improvements of fluid amplifiers have been noted in the patent art and in the literature. The number fo different types of fluid amplifiers has grown substantially and three types of fluid amplifiers are disclosed in the United States Patents No. 3,030,979 to Reilly, No. 3,039,490 to Carlson, and No. 3,080,886 to Severson. These three patents are typical of the patents issuing in the fluid amplifier art, and these patents contain discussions of various structures and forms of fluid amplifier elements and devices that are commonly in use.

Since the fluid amplifier art is a relatively young art, many variations and modifications have come about through the recognition of added control principles and through the necessary expedient of solving functional problems that have evolved in the use of the fluid amplifier in different types of systems. In the present application, a particularly serious problem has been recognized and overcome by the addition of an isolation chamber to part of a conventional fluid amplifier structure, and, further, through the addition of an isolation chamber that has a particular configuration as opposed to merely the addition of a chamber as would ordinarily be expected to be added to a fluid amplifier device. The present invention, that is, the addition of a particular type of isolation chamber, is furthre extended by disclosing the means of utilizing this chamber in an effective fashion in a conventional type of fluid amplifier control system.

It is the primary object of the present disclosure to provide a fluid control element of the fluid amplifier type wherein an isolation chamber is placed between the inlet means and the outlet means of the amplifier to absorb fluid interaction that normally would exist between the inlet and the outlet means.

Another object of the present invention is to disclose a fluid amplifier device that has an isolation chamber between the inlet and the outlets that is connected back to the source of fluid.

Yet another object of the present invention is to disclose a fluid amplifier that has an isolation chamber between the inlet and outlet, and, wherein the chamber has a large cross section that is perpendicular to the direction of flow of the controlled fluid and which cross section is large compared to the normal cross section of the fluid flow passages within the fluid amplifier.

These and other objects will become apparent when the present specification is considered along with the drawings, wherein.

Figures 1, 2, 3:
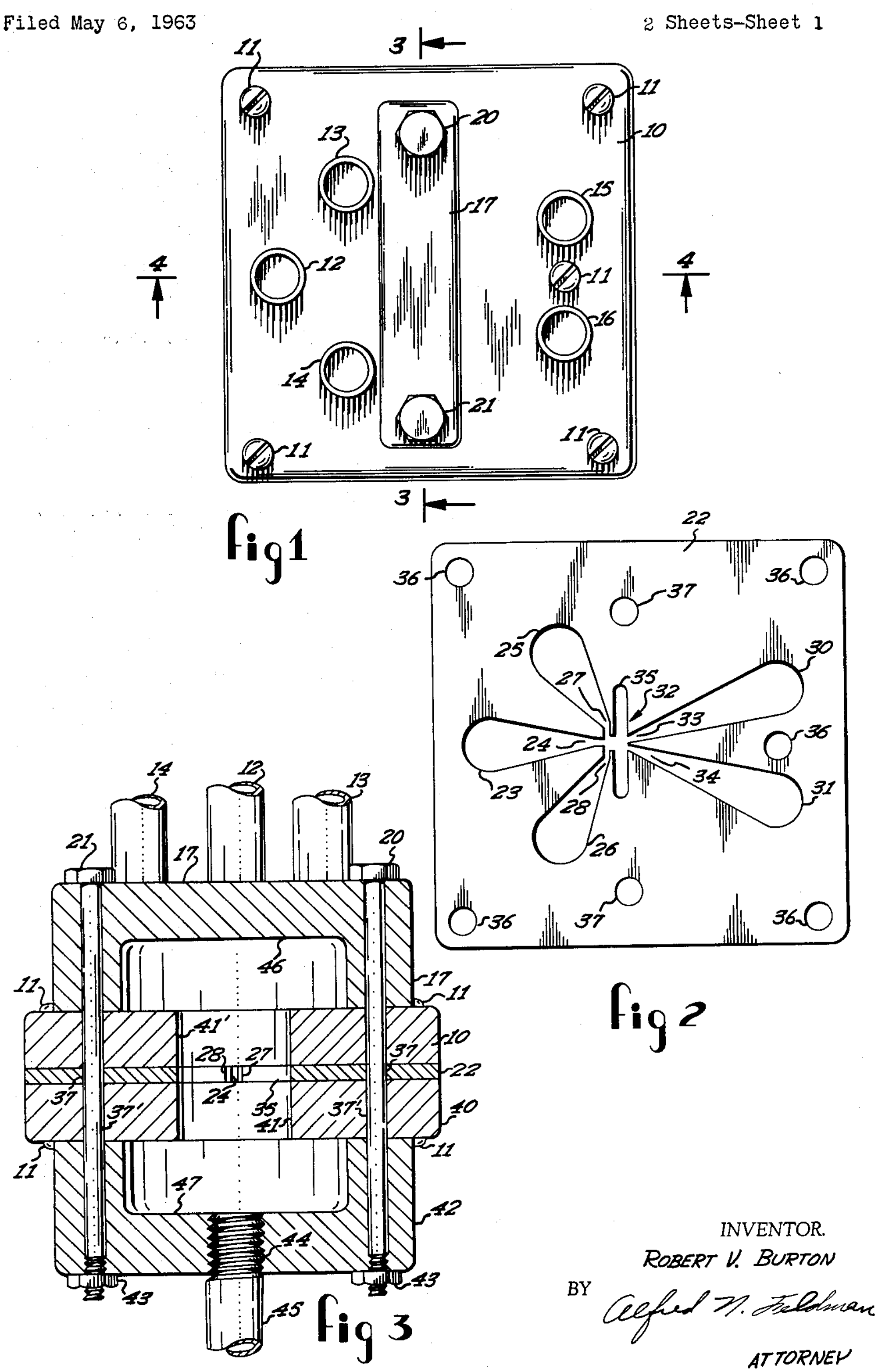
FIGURE 1 is a top view of a fluid amplifier control element.
FIGURE 2 is a center plate of the device of FIGURE 1, disclosing the internal fluid amplifier configuration.
FIGURE 3 is a cross section of FIGURE 1 taken along lines 3—3 to show an elevation of the device.
Figure 4:
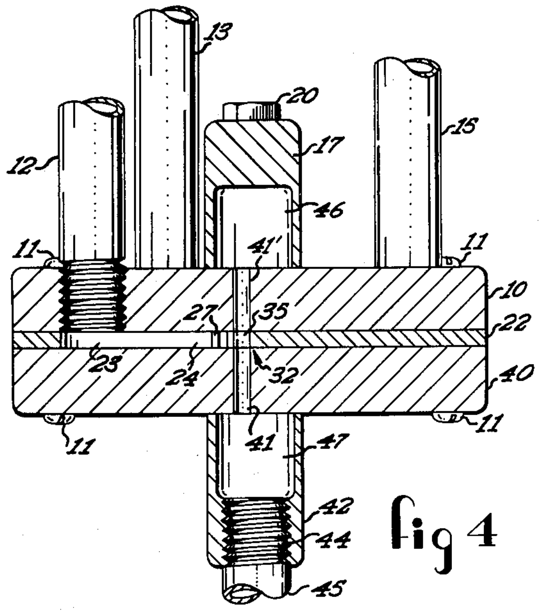
FIGURE 4 is a cross section of FIGURE 1 taken along lines 4—4 and at right angles to FIGURE 3.

The fluid amplifier disclosed in FIGURES 1–4 is built up in a fashion very similar to the fluid amplifiers disclosed in the previously-mentioned Reilly and Severson patents. The amplifier is made up of a number of laminated, fluid tight plates with a group of inlet and outlet fluid ports. More specifically, in FIGURE 1, a top view of the present invention is disclosed wherein a top plate 10 is assembled to the device by a plurality of bolts 11. The top plate 10 has a primary fluid inlet pipe 12 and a pair of secondary or signal fluid inlet pipes 13 and 14. Also, passing into the top plate 10 is a pair of outlet pipes 15 and 16. The pipes 12–16 constitute the normal five orifices for a fluid amplifier control device and their functions will become more apparent as the discussion of the device progresses. Disclosed in FIGURE 1 there is also an intermediate isolation chamber cover 17 which forms part of a fluid type housing that will be described in detail. The intermediate chamber cover 17 is held in place by a pair of bolts 20 and 21.

Disclosed in FIGURE 2 is a center plate 22 that is of a uniform height and which contains the main fluid flow passages. The first passages that will be discussed form the conventional fluid control element or fluid amplifier passages. A primary fluid inlet means 23 is provided with an inlet channel or passage 24. A pair of secondary fluid inlet or control means 25 and 26 are provided on opposite sides of the primary fluid inlet 23. Each of the secondary inlet means 25 and 26 have control ports 27 and 28 that are placed on opposite sides of the primary inlet 24.

A pair of fluid outlets 30 and 31 are provided from an outlet means generally disclosed at 32 which has a pair of outlet channels 33 and 34. It will be noted that the outlet means 32 and its associated outlet channels 33 and 34 are directly opposite the fluid inlet channel 24, but are separated from it by an oblong chamber 35. The oblong chamber 35 forms part of an intermediate isolation chamber means that will be described in detail, and which constitutes the heart of the present invention. The oblong member 35, in the plate 22, has the same height as the balance of the previously described channels, but is substantially wider than the outlet means 32. The intermediate plate 22 also has a plurality of holes 36 through which the assembly bolts 11 pass. Also disclosed is a pair of holes 37 through which the bolts 20 and 21 pass to hold the intermediate chamber cover 17 in place, as disclosed in FIGURE 1.

When viewing the device disclosed as shown in FIGURE 3, an additional plate or bottom plate 40 is disclosed. The bottom plate 40 is a flat platelike member that has a plurality of mounting holes that correspond to holes 36 of FIGURE 2, and two holes which correspond to holes 37 of FIGURE 2. The holes that correspond to 37 have been designated as 37′ for continuity. The bottom plate 40 further has a slot 41 cut through it which corresponds in dimension to the chamber 35. The fluid amplifier or control element is completed by the addition of a second isolation chamber cover 42 that is held in place by the bolts 20 and 21 along with a pair of nuts 43. The cover 42 is identical to cover 17, except for a tapped opening 44 into which an outlet pipe 45 is placed.

It will be noted that the cover plates 17 and 42 each have enlarged inner chambers 46 and 47 that are substantially larger in height and width than the slot 41 in the lower plate 40 and a slot 41′ that is contained in the upper plate 10. The oblong chamber 35 combined with the slots 40 and 40′ along with the chamber covers 17 and 42 provide an intermediate chamber means that has an outlet 45. The function of this intermediate chamber means will be described in detail subsequently in the present discussion. For the time being, it is only necessary to note that the intermediate chamber means separates the inlet means of the device from the outlet means of the device and has a cross-sectional area in a plane perpendicular to the main fluid flow path through the device that is substantially larger than the cross-sectional area of the inlet means formed by the passages 24, 27, and 28. It is further noted that the normal amplifier fluid flow passages are uniform in height and correspond to the thickness of the intermediate plate 22, except for the intermediate chamber means, which obviously has a much greater height than the balance of the passages. This can be readily seen in FIGURE 4, where the entire height of the intermediate isolation chamber means corresponds to the internal height of the chambers 46 and 47, as well as the full height of the plates 10, 22, and 40.

In operation, the device will first be considered as a conventional fluid amplifier with the discussion related to the configuration in plate 22 disclosed in FIGURE 2. The primary fluid flow through the inlet 24 is caused to be shifted into the outlets 30 or 31 by applying a pressure differential between the secondary inlets or control ports 27 and 28. The fluid flow from the inlet 24 is directed into the outlet channel 33 or the outlet channel 34 depending upon the pressures applied to the secondary inlets or control ports 27 and 28 and this function is well known in the art as the conventional fluid amplifier. It will be noted that all of the inlets 24, 27, and 28 and the outlet channels 33 and 34 are rectangular in cross section with their height being the height of the plate 22. The invention involved in the present application is the insertion of the intermediate chamber 35. The chamber 35, at least in plate 22, is an elongated volume. When this volume is coupled with the openings 41, 41' and the chambers 46 and 47 in the intermediate chamber covers, it becomes apparent that a relatively thin volume that has a large cross-sectional area compared to the cross-sectional area of the normal fluid flow passages has been provided. The essential of the chamber 35 is that the height of the chamber and the width of the chamber as compared to the height and width of the normal flow passages are large so that the fluid flow between the inlet 24, and the outlets 33 and 34 can be isolated from one another.

In the presently disclosed device, the intermediate chamber covers 17 and 42 have been provided with enlarged internal volumes 46 and 47 as an expedient for obtaining an outlet 45 that is capable of draining off excess fluid from the chamber 35 during the operation of the present device. The pipe 45 is connected to a pressure source which is lower than the inlet pressure to the inlet means 23 which is connected to pipe 12. In the operation of the device, the excess fluid flow that would normally pass from the inlet 24 to either of the outlet channels 33 or 34 can be taken off in the chamber 35. This arrangement provides an isolation of any pressure build-ups in the outlets 30 or 31 that would be reflected back to the input of the device if the chamber 35 did not exist. As such, in the present device, any transient fluid forces that would tend to be reflected back from the outlet of the fluid control device to the inlet or control sections of the fluid control device are absorbed and disposed of by the fluid flowing out of pipe 45. The function will become more apparent when a pair of typical systems are disclosed and discussed in connection with FIGURES 5 and 6.

Figures 5, 6:
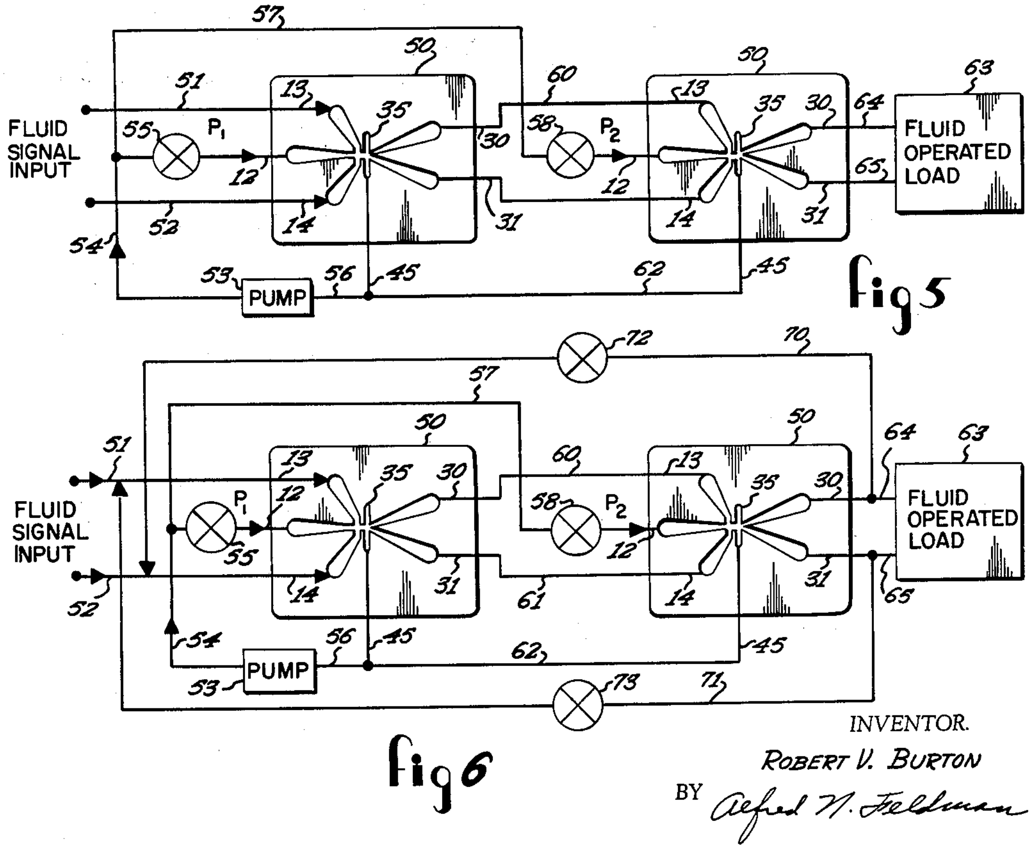
FIGURE 5 is a schematic circuit diagram showing the cading of two of the present fluid control elements in a fluid amplifier control system.
FIGURE 6 is a circuit diagram similar to FIGURE 5 showing a feedback arrangement.

In FIGURE 5, a pair of fluid control elements 50 are disclosed. These elements are identical to the device disclosed in FIGURES 1–4 and have been shown in schematic with the fluid flow passages corresponding to the passages disclosed in FIGURE 2. Fluid input signals are provided on pipes 51 and 52 and are normally derived from a fluid source that would be common to the main fluid inlet to the device. In this case, the fluid signal input on pipes 51 and 52 would be derived through a control device (not shown) from a pump 53. The pump 53 supplies on pipe 54 a fluid pressure to a valve or fluid control device 55 the necessary fluid for connection to pipe 12 for the fluid control element 50. In order to complete this particular system, the outlet pipe 45 is connected back to the inlet 56 of the pump 53. The restriction 55 in the input to the first fluid control element 50 is used to control the total fluid flow to the first element 50 to establish an operating quiescent point for the system. The outlet pipe 54 of the pump 53 is further connected by pipe 57 to a second impedance or valve 58 that is connected to the inlet 12 of the second fluid control element 50. It will be noted that the outlets 30 and 31 of the first fluid control element are connected by means of pipes 60 and 61 to the secondary inlet or signal inlet means on pipes 13 and 14 of the second fluid control element 50. Once again, an intermediate chamber 35 is provided and has a pipe 45 that is connected back by means of pipe 62 to the inlet of pump 53. The two stages or fluid control elements 50 are cascaded in a series arrangement and the second of these stages has its outputs 30 and 31 connected to a fluid operated load 63 by means of pipes 64 and 65. In the particular case disclosed, the fluid operated load could be such a load as a piston operator which is basically a pressure operated device and not a flow operated device. If a flow operated load is involved, a connection from the flow operated load 63 would not be necessary back to the pump 53 to return the fluid flow in the system as it would return through the opposite channel and chamber 35.

In the system disclosed in FIGURE 5, the pressure from pump 53 is applied to the system and a quiescent operating level is established by adjusting the valves 55 and 58 so that the pressures to the inlet means 12 of each of the fluid control elements 50 are proper and wherein the pressure to the first of the elements is lower than to the second of the fluid control elements 50. If a quiescent condition is considered wherein no signal fluid input is applied to pipes 51 and 52, it will be noted that the fluid flow into the control elements 50 passes straight through and for all practical purposes is balanced. This excess fluid must have an outlet and this outlet is on pipe 45 back to the inlet of the pump 53. With this arrangement, an equal pressure is applied to the outlet pipes 64 and 65 to the fluid operated load 63 and the load does not move.

It it is desired to cause the fluid operated load 63 to move, a differential signal is applied to pipes 51 and 52 by any convenient control device (not shown). This differential pressure is applied to the signal control inlets 13 and 14 of the first control element 50 and causes the fluid flow that is entering on the primary inlet pipe 12 to pass out of one or the other of the outlets 30 or 31. The outlet pressure on the pipes 60 or 61 of the first fluid control element 50 is applied directly as a control signal to the second fluid control element 50 and directs the second fluid control element 50 to have a resultant output on one of the pipes or outlet circuits 64 or 65. This operates the fluid operated load 63 toward the desired position. During this operation, the excess fluid not required by the load must be drained off the device in order to prevent the reflection of this load back to the input of the fluid amplifier. This is the function of the intermediate chamber means 35. Any reverse flow or pressure that tends to back up in the device is taken off in the chamber 35 and is fed back to the input of the pump 53.

It has been found that pressure chambers of the type disclosed at 35 which have the same height as the intermediate plate 22 and therefore have the same height as the balance of the fluid flow channels is not satisfactory. It has been found that, in order to effectively isolate the input and output circuits of the fluid amplifier element, it is essential that the height of the intermediate chamber means 35 be substantially greater than the height of the fluid flow channels in the balance of the device. As such, the present invention is specifically directed to an intermediate chamber means that separates the fluid inlet means from the fluid outlet means and wherein the chamber has a cross-sectional area in a plane perpendicular to the direction of flow that is substantially larger than the cross-sectional area of the inlet means.

In FIGURE 6, a system substantially the same as that in FIGURE 5 has been disclosed with the addition of a feedback arrangement wherein pipes 70 and 71 are connected to pipes 64 and 65 to allow feedback through the pipes 70 and 71 and variable restrictions 72 and 73 to the input pipes 51 and 52 where the fluid signal input is provided. This feedback arrangement stabilizes the circuit disclosed in FIGURE 6 and the balance of the operation is the same as that disclosed in connection with FIGURE 5.

From the previous discussion and description of the invention, it becomes apparent that a fluid control element or fluid amplifier of substantially conventional form, such as disclosed in the previously-mentioned Reilly or Severson patents, has been modified by the placement of an intermediate chamber for absorbing pressures that would normally interact between the inlet and outlet of the device. In order to be effective, the intermediate chamber must have a dimension which is substantially higher than the conventional fluid flow channels and the chamber further is connected back to a lower source of pressure than the input to the fluid control element or amplifier. Since it would be possible to provide this arrangement in many physical configurations, the applicant in the present case has shown only a single preferred embodiment. Since it would be obvious to one skilled in the art how this invention could be incorporated in various physical embodiments, the scope of the present invention can be considered only in view of the scope of the appended claim.

I claim as my invention:

A fluid control element, including: a primary fluid inlet supplied with a fluid to be controlled; fluid outlet means including two outlet channels; secondary fluid inlet means adjacent said primary fluid inlet and having a pair of openings directed across said primary fluid inlet to apply a control signal to said element to direct said fluid in said outlet means between said two outlet channels; said inlet, said outlet means, and said pair of openings having a uniform height; and an intermediate chamber separating said pair of openings and said outlet means; said intermediate chamber having a cross-sectional area in a plane perpendicular to said primary fluid flow that is substantially larger in height and width than said inlet and said outlet means; said intermediate chamber having a front side adjacent to said primary inlet and parallel to said plane, a back side adjacent to said outlet channels and spaced from said front side, a top member transversely spaced from said inlet and said outlet means and connecting said front side to said back side, a bottom member transversely spaced from said inlet and said outlet means and connecting said front side to said back side, a first end member transversely spaced from said inlet and said outlet means and connecting said front side to said back side, and a second end member transversely spaced from said inlet and said outlet means and located opposite said first end member, said second end member connecting said front side to said back side; said intermediate chamber having in addition an outlet for venting excess fluid therefrom; said intermediate chamber absorbing fluid forces between said inlet and said outlet means to thereby isolate fluid forces in said outlet means.

References Cited by the Examiner

UNITED STATES PATENTS

| | | | |
|---|---|---|---|
| 2,228,015 | 1/1941 | Neukirch | 137—111 |
| 3,122,165 | 2/1964 | Horton | 137—81.5 |
| 3,128,040 | 4/1964 | Norwood. | |
| 3,181,546 | 5/1965 | Boothe | 137—81.5 |
| 3,187,763 | 6/1965 | Adams | 137—81.5 |

FOREIGN PATENTS

| | | |
|---|---|---|
| 1,278,781 | 11/1961 | France. |

M. CARY NELSON, *Primary Examiner.*

LAVERNE D. GEIGER, *Examiner.*

S. SCOTT, *Assistant Examiner.*